March 15, 1966

H. PALMER 3,240,084

APPARATUS FOR BORING METAL PLATES

Filed March 24, 1960

INVENTOR.
HERMAN PALMER
BY

ATTORNEY

March 15, 1966     H. PALMER     3,240,084
APPARATUS FOR BORING METAL PLATES
Filed March 24, 1960     4 Sheets-Sheet 3

INVENTOR.
*HERMAN PALMER*
BY

*ATTORNEY*

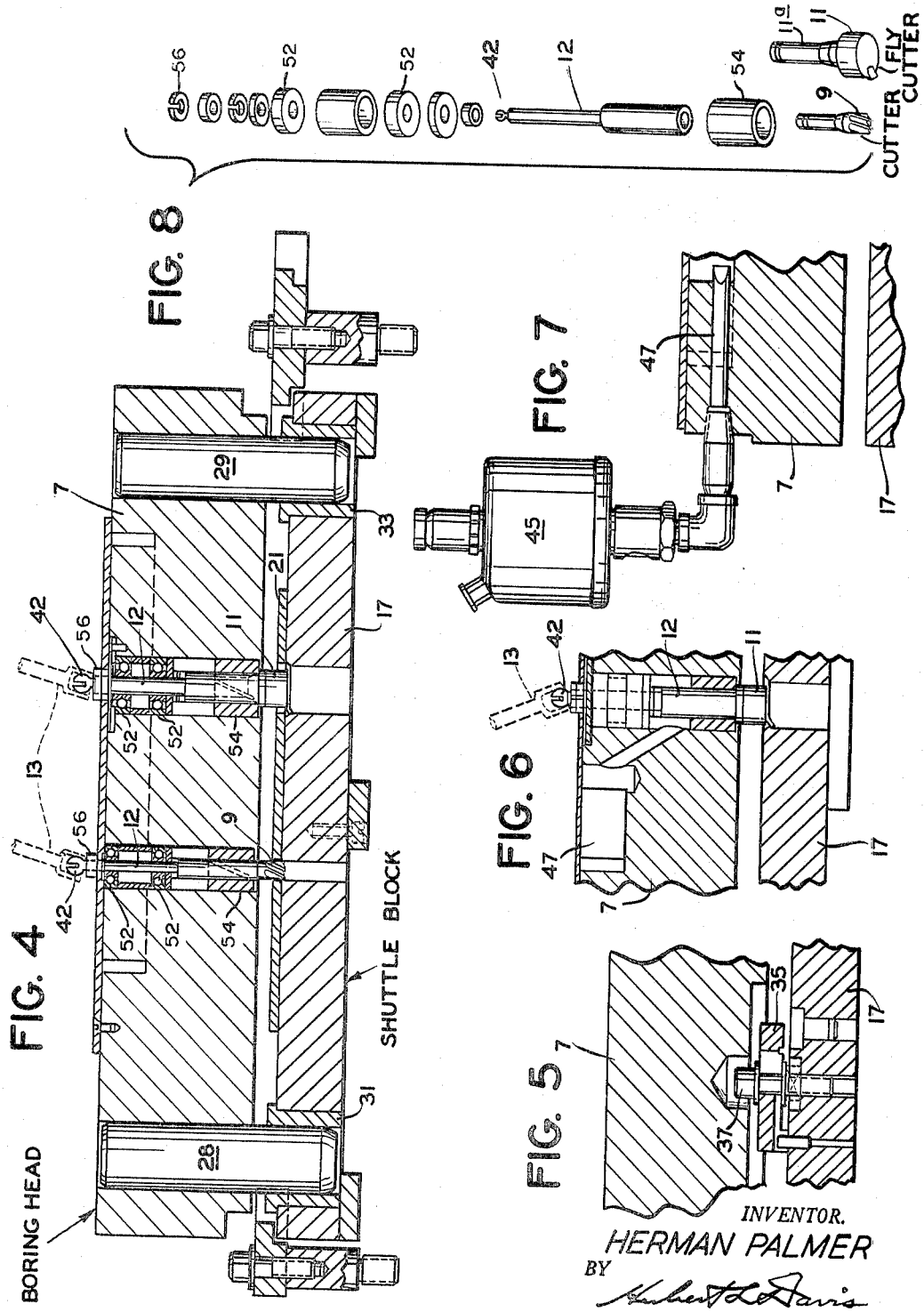

United States Patent Office 3,240,084
Patented Mar. 15, 1966

3,240,084
APPARATUS FOR BORING METAL PLATES
Herman Palmer, Hasbrouck Heights, N.J., assignor to The Bendix Corporation, a corporation of Delaware
Filed Mar. 24, 1960, Ser. No. 17,736
2 Claims. (Cl. 77—4)

The present invention relates to apparatus for boring metal plates for use in all types of instruments, particularly in those cases in which a large number of holes are required to meet a close tolerance on bores and also on center distances as in precision mechanism in which tolerances must be maintained such as ±.0001 on bored diameters and $$+.0002$$
$$-.0000$$

on hole locations. The present application is a continuation-in-part of application Serial No. 663,430 filed June 4, 1957 and now abandoned.

An object of the invention is to provide an apparatus by which multi-holed plates may be manufactured to the above tolerances more rapidly and without the costly operations by which the same have been heretofore accomplished. For example, prior to the applicant's invention such plates have been manufactured by single tool bit boring, one hole at a time, in a Jig-Borer Boramatic, or difficult lathe set-up. For a plate with forty holes, for example, forty to fifty hours were required to complete the plate and a highly skilled jig-borer operator was needed to do the boring. Each hole required a separate set-up with the possibility of error and subsequent rejection of the plate.

With applicant's novel apparatus the forty holes in the exemplary plate are bored to the required tolerances in two or three borings in ten minutes or less by an unskilled workman with no possibility of error. The cost of the plates is reduced tremendously, by a saving in time, the lower degree of skill required by the workman, and the lower rejection rate of finished plates.

The invention contemplates a precision multi-spindle boring device for simultaneously boring a plurality of holes in a work piece to tolerances of ±.0001 on diameters and $$+.0002$$
$$-.0000$$

on hole locations, comprising a boring head having locating elements and provided with rotating spindles for mounting boring tools, the spindles being dimensioned from the locating elements in accordance with the work piece to be bored, motor means, flexible driving connections between the motor means and spindles, and a shuttle block for mounting the work piece and having locating elements cooperating with the locating elements on the boring head for accurately positioning the work piece with respect to the boring head to maintain the foregoing tolerances. A bank of two or more such devices may be used for successively boring a plate and each device may be equipped with as many as twenty-four boring tools.

The processed plate is first roughed out by either drilling or punching. Thereafter the plate is mounted on the shuttle block and successively positioned under each boring head so that the previously roughed out holes may be accurately finish bored by cutters or fly cutters driven by the boring spindles. Thus center distances which are too close for one boring head due to spindle spacing may be processed under two or more boring heads.

In the boring operation the work plate is clamped to the shuttle block and positioned in precise relation to the boring head by means of locating holes in the shuttle block cooperating with a pair of hardened guide pins projecting from the boring head. Clamps on the shuttle block secure the work plate in a stationary position relative to the shuttle block until completion of all of the boring steps so that more precise hole locations and bore diameters can be maintained and in far less time than heretofore.

This and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

In the drawings:

FIGURE 4 is a sectional view of the shuttle block and boring head of FIGURES 2 and 3 in assembled relation.

FIGURE 5 is a fragmentary sectional view taken along the lines 5—5 of FIGURE 2 and illustrates the securing clamp for the work plate.

FIGURE 6 is a fragmentary sectional view taken along the lines 6—6 of FIGURE 3 and illustrates a fly cutter in operative relation.

FIGURE 7 is a fragmentary sectional view taken along the lines 7—7 of FIGURE 3 and illustrates a channel and oil receptacle for the boring head.

FIGURE 8 is an exploded view of the bearings and spindle with two different type cutters.

Figure 1:
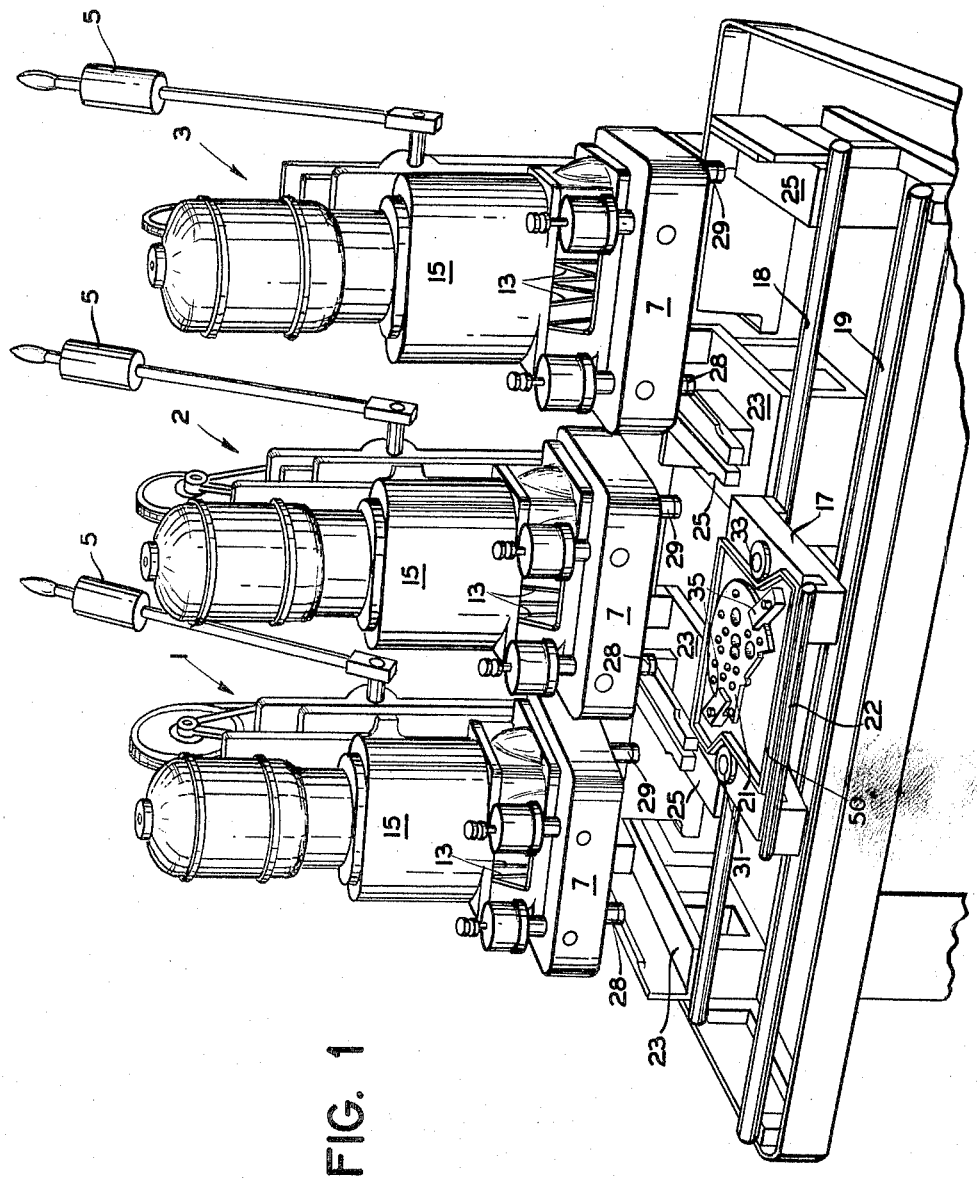
FIGURE 1 is a view of a typical machine set-up illustrating three boring machines equipped with boring heads and a rail arranged for sliding a shuttle block carrying a work plate from head to head.
Figure 2:
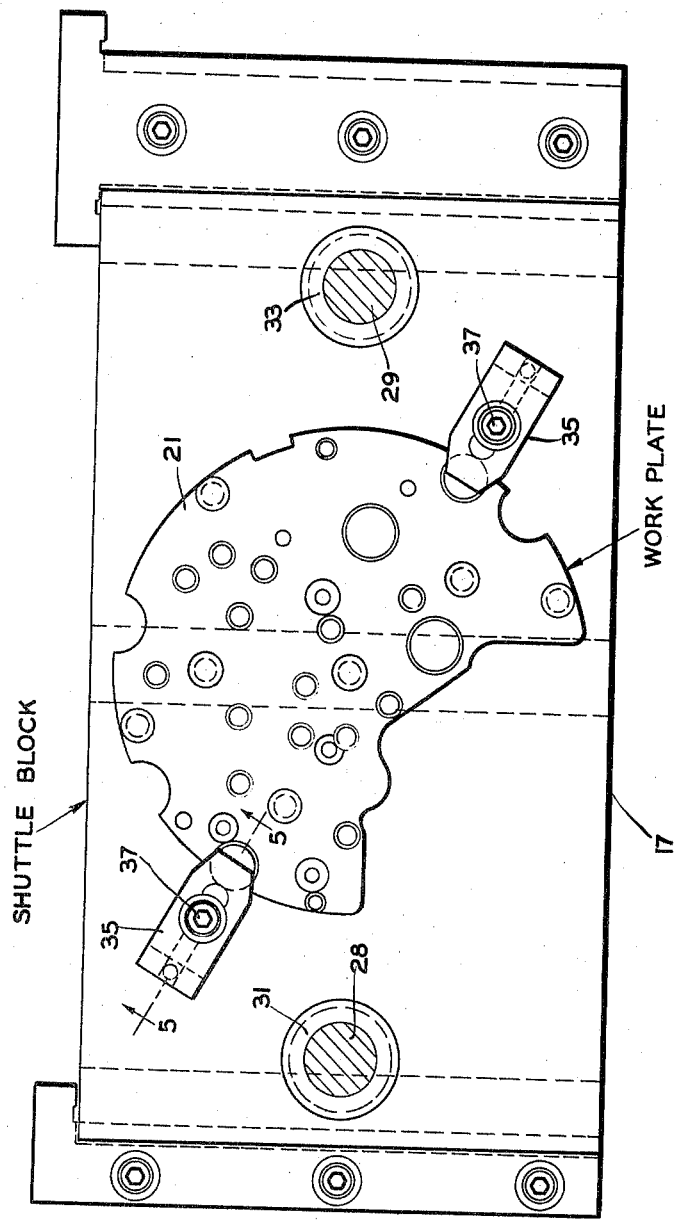
FIGURE 2 is a top plan view of a modified form of shuttle block from that of FIGURE 1.

In FIGURE 1 of the drawings there is illustrated, by way of example, three boring machines 1, 2 and 3 of like construction and including a manually operable arm 5 for individually lowering the corresponding boring head 7 of the machines 1, 2 or 3 into operative relation.

Each of the boring machines 1, 2 and 3 have a boring head 7 including cutters 9 and fly cutters 11 shown in greater detail in FIGURE 4, each driven by a spindle 12 and swivel drive shaft 13 from a motor unit 15 carried by the boring head, as shown in FIGURE 1.

There is further provided the indexable shuttle block 17 slideably mounted on the rails 18 and 19 and carrying a work piece in the form of a plate 21 having therein a multiplicity of holes roughed out by either drilling or punching and thereafter subject to a boring operation by the cutters 9 and fly cutters 11 of the respective boring heads 1, 2 and 3, as hereinafter explained.

The shuttle block 17, as shown in FIGURE 1, has a hand rail 22 by which the operator may slide the shuttle block 17 along the rails 18 and 19 to a position adjacent any one of the boring heads 1, 2 and 3, selected by the operator. Thereafter the operator may slide the shuttle block 17 laterally from the rails 18 and 19 on to the tracks 23 and 25 immediately below the selected boring head 7 so that as the boring head 7 is lowered guide pins 28 and 29 projecting from the boring head 7 cooperate with hardened steel bushings 31 and 33 in the shuttle block 17. The last-mentioned action causes the guide pins 28 and 29 to accurately align the shuttle block 17 relative to the boring head 7 and associated cutters 9 and fly-cutters 11, as shown in FIGURE 4, upon the operator adjusting the boring head 7 downward by operation of the arm 5.

The work plate 21, as shown in FIGURE 1, is secured to the shuttle block 17 by clamps 35, each pivotally mounted thereon by a pin 37, as shown in detail in FIGURE 5.

All spindle holes in each boring head 7 are dimensioned in accordance with the work plate 21 to be precision bored from the two guide pins 28 and 29 of the boring head which cooperate with the bushings 31 and 33, respectively, in the shuttle block 17 to effect a precision alignment of the shuttle block 17 with the boring head 7. Where center distances are too close for spindle spacing the boring operation of one of the holes may be effected under one boring head, while the boring operation of other of said holes may be effected under the second and third of said boring heads.

Each of the boring heads 7 has spindles 12, shown in detail in FIGURES 4 and 8, made of hardened tool steel precision ground on O.D. and I.D. to control concentricity for proper location of the spindle 12 and cutting tools. Each of the spindles 12 is fully embedded in the boring head 7 by means of a combination of precision ball bearings 52 and bushing 54 and is drivingly connected at one end 42 through the spindle drive shaft 13 to the motor 15 of the boring machine while at the opposite end of the spindle 12 are mounted the cutting tools, i.e. the cutter 9 or fly cutter 11, with their cutting portions closely adjacent to bushing 54 to avoid deflection of the boring tool during a boring operation as shown in FIGURES 4 and 8. The fly cutter 11 preferably is mounted on an eccentric boring bar 11a so that the fly cutter can be precision adjusted thereon to accuracies of .0001 of an inch on hole diameters. Spindles 12 are preloaded by means of adjusting nuts 56 threaded on the spindles. This arrangement eliminates spindle vibration and spindle runout and makes possible a 5 micro-inch finish.

Figure 3:
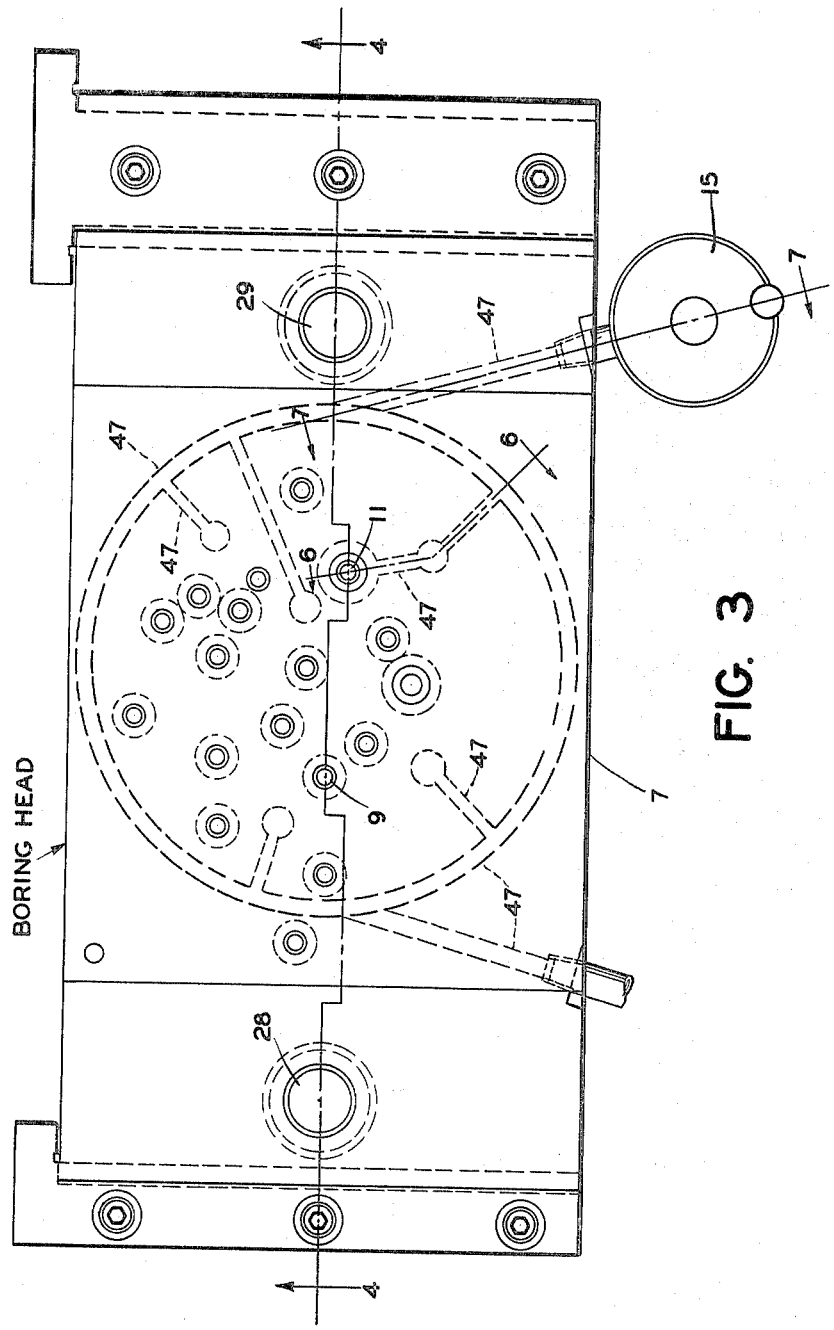
FIGURE 3 is a top plan view of a boring head for the shuttle block of FIGURE 2.

Oil is fed to the spindles 12 in each boring head by means of oil cups 45 as illustrated in FIGURES 1, 3 and 7, mounted on the boring head and suitable passages 47 in the boring head leading to the spindles 12, as illustrated, for example, in detail in FIGURE 7, and through the spindle and bearings to the work plate 21 immediately below the boring head. The shuttle block 17 of FIGURE 1 has a raised portion or ridge surrounding the plate 21 so as to catch the oil dripping through the spindles and bearings and immerse the work plate 21 in oil during the boring process. Numeral 50 indicates the ridge.

The herein described precision boring mechanism is a new concept in boring precision metal gear plates and consists of one or more precision boring heads driven by a multi-spindle boring machine. The work plate is located in a shuttle type fixture 17 which is accurately aligned to the precision boring head 7 by means of the guide pins 28 and 29. The guide pins 28 and 29 are located in the boring head 7 and the shuttle block 17 is equipped with accurately located bushings 31 and 33.

The plates to be bored are prepared by means of conventional manufacturing methods and either punched or drilled. The plates should be perfectly flat before boring.

A typical boring machine set-up is illustrated by FIGURE 1 which shows three (3) boring machines 1, 2 and 3 each equipped with a boring head 7. Rails 18 and 19 are set-up for sliding the shuttle block 17 from head to head so that closely located holes may be bored with precision in a step-by-step process in which one of the closely located holes is bored under one head and other of said holes bored under the other of said heads. All holes in the boring head are dimensioned from the two guide pins 28 and 29. The shuttle block 17 is designed to locate from the two (2) hardened steel bushings 31 and 33 which are accurately aligned from the guide pins 28 and 29 in the boring head 7. Thus the process allows boring of holes closer together than the diameter of the boring tools by virtue of having several boring positions.

Although only two embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a mechanism of the character described; comprising in combination a plurality of boring heads, each boring head having a multitude of boring tools, a shuttle block, rail means to slideably support said shuttle block relative to the boring heads, clamping means to secure a work plate on said shuttle block, track means mounted below each of the boring heads, operator-operative means to shift the shuttle block laterally from the rail means onto one of said track means and immediately below a selected boring head, means to vertically adjust each of said boring heads relative to said shuttle block, each of the boring heads having a pair of guide pins projecting therefrom, means carried by the shuttle block and arranged to cooperate with the guide pins to effect a precision alignment of the shuttle block with any one of the boring heads upon said boring head being lowered relative to the shuttle block so as to thereby determine the position of the boring tools of such boring head to the work plate, oil supply means carried by each of the boring heads, passageway means in each of the boring heads for conducting oil from the supply means to the multitude of boring tools, and means carried by the movable shuttle block and surrounding the work plate for collecting oil drippings from the boring tools so as to maintain the work plate immersed in the oil therefrom during the boring operation.

2. In a mechanism of the character described; comprising in combination a plurality of boring heads, each boring head having a multitude of spindle holes, boring tools, each boring tool having a spindle, means rotatably mounting each tool spindle in a spindle hole, a shuttle block, rail means to slideably support said shuttle block relative to the boring heads, clamping means to secure a work plate on said shuttle block, track means mounted below each of the boring heads, operator-operative means to move the shuttle block laterally from the rail means onto one of said track means and immediately below a selected boring head, means to vertically adjust each of said boring heads relative to said shuttle block, each of the boring heads having a pair of guide pins projecting therefrom, bushing means carried by the shuttle block and arranged to cooperate with the guide pins to effect a precision alignment of the shuttle block with any one of the boring heads upon said boring head being lowered relative to the shuttle block so as to thereby determine the position of the boring tools of such boring head to the work plate, an oil cup mounted on each boring head, each boring head having passageways leading from the oil cup to each spindle hole for conducting oil from the oil cup to the boring tools, and a raised portion on the shuttle block surrounding the work plate for collecting oil drippings from the boring tools so as to maintain the work plate immersed in the oil therefrom during the boring operation.

References Cited by the Examiner

UNITED STATES PATENTS

| | | | |
|---|---|---|---|
| 1,159,196 | 11/1915 | Eden | 77—36 |
| 1,660,372 | 2/1928 | Bockhoff | 74—24 |
| 2,068,594 | 1/1937 | Buhr | 77—22 |
| 2,139,403 | 12/1938 | Cole. | |
| 2,396,370 | 3/1946 | Hartnett et al. | 77—22 |
| 2,432,633 | 12/1947 | Sirp | 77—22 |
| 2,780,467 | 2/1957 | Jackson. | |

FOREIGN PATENTS 915,052   7/1954   Germany.

WILLIAM W. DYER, Jr., *Primary Examiner.*

FRANK H. BRONAUGH, FRANK E. BAILEY,
*Examiners.*